US008626145B2

(12) United States Patent
Han

(10) Patent No.: US 8,626,145 B2
(45) Date of Patent: Jan. 7, 2014

(54) DEVICE BASED TELECOMMUNICATIONS INITIATED DATA FULFILLMENT SYSTEM

(75) Inventor: Wen Khang Han, Lexington, MA (US)

(73) Assignee: Zoove Corporation, Palo Alto, CA (US)

( * ) Notice: Subject to any disclaimer, the term of this patent is extended or adjusted under 35 U.S.C. 154(b) by 0 days.

(21) Appl. No.: 13/599,239

(22) Filed: Aug. 30, 2012

(65) Prior Publication Data

US 2013/0090107 A1  Apr. 11, 2013

Related U.S. Application Data

(63) Continuation of application No. 11/999,321, filed on Dec. 5, 2007, now Pat. No. 8,260,267.

(51) Int. Cl.
*H04M 3/42* (2006.01)
*H04M 3/00* (2006.01)

(52) U.S. Cl.
USPC ............. 455/418; 455/414.1; 455/414.2; 455/518; 455/519; 455/521; 455/552.1; 455/553.1

(58) Field of Classification Search
USPC .......... 455/414.1, 414.2, 418, 518, 519, 521, 455/552.1, 553.1
See application file for complete search history.

(56) References Cited

U.S. PATENT DOCUMENTS

| 6,131,028 A * | 10/2000 | Whitington ............... 455/456.2 |
| 6,141,545 A * | 10/2000 | Begeja et al. ............... 455/417 |
| 6,574,467 B1 * | 6/2003 | Jonsson ..................... 455/414.1 |
| 6,622,016 B1 * | 9/2003 | Sladek et al. ............... 455/414.1 |
| 6,819,920 B2 * | 11/2004 | Shi et al. .................... 455/414.1 |
| 7,242,948 B2 * | 7/2007 | Fleischer et al. ........... 455/456.3 |
| 2002/0155828 A1 * | 10/2002 | Tuomainen et al. ......... 455/414 |
| 2004/0242240 A1 * | 12/2004 | Lin ............................ 455/456.3 |

* cited by examiner

*Primary Examiner* — Olumide T Ajibade Akonai
(74) *Attorney, Agent, or Firm* — Bingham McCutchen LLP

(57) ABSTRACT

A system and method for service fulfillment is based on service invocation with a preprogrammed communication device. The communication device recognizes special multi-function code digit sequences to cause service invocation. The preprogrammed communication device, upon recognition of a multi-function code, selects a communication channel or messaging protocol and forwards information related to the service invocation to a service fulfillment platform. The communication channel or messaging protocol may be selected based on availability, optimization, preprogrammed logic associated with the multi-function code, or other parameters related to the service invocation, such as user, subscription, registration, location or device ID. The preprogrammed communication device permits service invocation without reconfiguration of a communication network to which the communication device is coupled. The communication device can be reconfigured or reprogrammed to recognize and respond to different multi-function codes.

14 Claims, 3 Drawing Sheets

DEVICE BASED TELECOMMUNICATIONS INITIATED DATA FULFILLMENT SYSTEM

CROSS REFERENCE TO RELATED APPLICATIONS

This application is a continuation of, and claims priority to, U.S. patent application Ser. No. 11/999,321, filed Dec. 5, 2007 now U.S. Pat. No. 8,260,267, entitled "DEVICE BASED TELECOMMUNICATIONS INITIATED DATA FULFILLMENT SYSTEM."

STATEMENT REGARDING FEDERALLY SPONSORED RESEARCH OR DEVELOPMENT

N/A

BACKGROUND OF THE INVENTION

The present invention relates generally to a system and method for invocation and fulfillment of service requests from a communication device in a communication system, and relates more particularly to a system and method for invocation and fulfillment of services requested from a communication device preprogrammed to recognize service invocation codes.

Invocation and fulfillment of services from a communication device, especially a telephone, in a communication system has been implemented in accordance with various techniques to help simplify service invocation and expand service offerings. Such systems could be employed, for example, to direct a call to a pizzeria nearest the caller's home address when the call is placed to a central number to order a pizza.

Prior service invocation systems have been implemented in a communication system with a telecommunications switch configured to recognize a service invocation and conduct operations leading to service fulfillment. A telecommunications switch is a component in a networked communication system, responsible for providing connections through the communication system on an automatic basis. A cellular communication system employs telecommunications switches called mobile switching centers (MSC) that operate to provide connectivity for cellular radio-based communications. The term "telecommunications switch" is meant to encompass MSCs, wireline or land-based communications switches, IP PBX (internet protocol private branch exchange), television set-top boxes, routers, session initiation protocol (SIP) devices, and any other type of telecommunications equipment that can offer automatic switching.

Transmitted dialed digit strings may be used to invoke services from a communication device. Typically, the dialed digit strings are shorter than a directory telephone number, and are sometimes referred to as "short codes." In the following discussion, the term short code refers to an entire dialed digit string representing a code other than a directory dialed number. The short code is to be differentiated from a short message service (SMS) code, where a user purposely selects SMS messaging to send a message, and sends a code to a particular SMS address entered by the user. The user provides the short code with an originating communication device, such as a telephone, and then transmits the short code to a telecommunications switch to prompt the service invocation. The short code typically includes a code prefix, such as "#", followed by a service code, which is a string of numerical digits that can be represented as letters associated with numerical buttons on a telephone keypad.

One available system uses transmitted dialed digit strings referred to as abbreviated dial codes (ADCs) to permit service invocation. The ADCs are typically associated with a specific carrier, and are implemented by provisioning a telecommunications switch with static entries in a translation table or with static translation rules. The translation table or rules have entries for ADCs and corresponding directory telephone numbers into which the ADCs are translated. The ADC is recognized by the telecommunications switch as a call that receives special treatment compared to a directory telephone number call.

An example of an ADC implementation involves a cellular phone communicating with a serving mobile switch center (MSC). The cellular phone user enters an ADC and presses "send" to transmit the ADC to the MSC. The MSC translates the ADC to a dialable or "routable" number for purposes of call setup. The resulting routable number is used to connect the caller with an interactive voice response (IVR) that provides voice prompts to permit the caller to select desired content, which is pushed to the wireless phone upon selection. The translations typically convert the ADC to a toll-free number for the purposes of routing a call from a communication device through the communication network. In this configuration, a translation entry or a translation rule is provisioned within the MSC for each ADC for each service desired, and for each carrier that wishes to provide the service indicated by the associated ADC.

One short code system involves GSM (Global System for Mobile Communications) unstructured supplementary service data (USSD), which provides a standard-based approach to allow users to use preprogrammed, i.e., USSD capable mobile devices, to make special network service requests, such as account balance inquiries, initiating/canceling call forwarding, and other service requests, for example. The telecommunication switches and USSD capable devices, such as mobile devices capable of making special network service requests, are provisioned or preprogrammed to recognize a specific dialing sequence containing a special prefix and special suffix. The prefix, such as "**", for example, and suffix, such as "#" indicate that the code encompassed by the prefix and suffix is a USSD code, which is recognized by both the communication device and telecommunication switch to fulfill the special network service request. The preprogramming and provisioning of both the communication device and the telecommunications switch is based on GSM standards specified by standard committees associated with implementing the GSM standards.

In some cellular radio telecommunication systems, the MSC is provisioned with triggers to recognize short codes. U.S. Pat. No. 5,898,917 describes one prior system, in which trigger criteria is defined in the MSC using the "#" character. Calls received by the MSC that include the "#" character are followed by a digit sequence that identifies the service to be invoked. Receipt of the "#" character results in the MSC suspending call processing and generating a service query message to a service control point (SCP). The service query message includes the digit sequence identifying the invoked service. The SCP interprets the query message including the digit string to determine how the call is to be handled. The SCP provides a response to the MSC with instructions or information that indicates how the call is to be handled. If the SCP recognizes the digit sequence, the response to the MSC typically indicates that the call should be forwarded to an IVR system where the caller receives voice content, such as voice instructions or information.

As described above, a trigger is a configuration of call-processing logic associated with a given point in a call. Triggers are generally implemented in software to carry out instructions to initiate a communication network process based on analysis of status conditions at a detection point (DP) in the call. A DP is a part of a sequence in a basic call state model (BCSM) at which status conditions related to the call can be determined.

In the above described arrangement, the telecommunications switch in the communication system is configured and enabled to recognize short codes. The telecommunications switch may be configured for a variety of triggers, including subscriber-based, group-based and office-based. Subscriber-based triggers, which a carrier implements in a separate database, instruct the telecommunication switch how to handle a call from a specific subscriber containing a digit string containing a short code. Group-based triggers provide call handling that is consistent for a particularly defined group. Office-based triggers are provided for general use to handle calls for a generic user. The features provided by office-based triggers are generally available to all users that access the telecommunications switch. The user need not have a subscription or registration to obtain the features offered by the provisioning in the telecommunications switch of the office-based trigger. Implementing an office-based trigger is accomplished by reconfiguring the telecommunications switch to recognize the desired short codes.

Services available through short code dialing can relate to telecommunication features, such as 800 services, credit card verification, geographic call routing, flexible call routing, flexible carrier selection and other features that may be carrier based. In addition, a variety of service fulfillment activities are available that are not necessarily related to telecommunication service. For example, service fulfillment may be in the form of storage of a preference, a return voice call, an SMS (short message service) text message, email messages, facsimile machine delivery, a WAP (wireless application protocol) push, or traditional postal system mail. Types of services that may be available can include, for example, providing information about advertised products or services, participation in voting or polling activities, obtaining reprints of articles or other publications, browsing and purchasing magazine subscriptions, or downloading of ring tones.

The provisioning of translation entries, translation rules or triggers in the MSC can be complex and relatively difficult, and thus represents an administrative burden for administrators of the MSC and the communication system. The volume of services that may be made available can be vast, and the available services may change on a rapid basis. For example, an offered service may be tied to a short-term promotional activity of a sponsor for a specific time interval of a given day. Implementing such a service would mean provisioning the MSC with a specific translation entry, translation rule or trigger to recognize the short code, and subsequently removing the translation entry, translation rule or trigger for recognition of the short code shortly thereafter. Each time an administrator interacts with the MSC to provide or remove translation or trigger provisions, the effort can prove costly, complex and time consuming. Translations or triggers may be provisioned in an MSC and armed or disarmed according to how a service provider or carrier wishes to offer a service connected with the translation or trigger. However, changing how a translation or trigger is armed or disarmed represents a similar challenge to that of modifying the MSC in that the carrier subscriber database would be modified to reflect the change in translation or trigger treatment.

In addition, provisioning an MSC to recognize a short code represents a nontrivial task because of the configuration of the MSC and the BCSM. Provisioning a given office-based trigger, for example, intended to recognize a short code, calls for selective arming according to a number of different criteria. The trigger may be inserted in a number of different DPs within the BCSM. In addition, the trigger may have a number of different criteria for being actuated.

For example, subscriber-based intelligent network triggering may be armed at a home location register (HLR), allowing establishment of trigger criteria at a serving visitor location register (VLR) and MSC. However, trigger conflicts may arise at the MSC when various applications, such as, for example, prepaid communication service, virtual private network (VPN) and other trigger-based applications vie for trigger firing at the same DP within the intelligent network BCSM.

Previous approaches to solving these conflicts, sometimes referred to as "trigger collisions," involve the use of a service interaction manager, which is a functional element that, in the case of an office-based trigger, mediates messaging between the telecommunications switch or MSC and SCP to permit multiple applications to use the same DP. Trigger-based applications typically seek to be actuated or fired at DP number two (DP-2) for most implementations.

The service interaction manager is configured to receive an initial query from an MSC to manage the services invoked at a triggered DP acting as the source of the query. The service interaction manager therefore manages interactions between services that are provisioned at the same trigger point. The management provided by the service interaction manager permits service invocation priority to be established, as well as providing interaction between network components to appropriately handle all service invocations while avoiding service invocation interference. The service interaction manager function may reside in the HLR or the SCP.

In the case of short code services implemented in a telecommunications switch or MSC at a given trigger detection point in the BCSM, there is a limitation on the trigger responses. The trigger firing criteria for particular digits that are part of the short code, such as "#", causes a query or message to be launched to the same SS7 point code destination address, regardless of the particular digits that are used. SS7 signaling and addressing is described in greater detail below. For example, appropriate triggers provisioned in the telecommunications switch or MSC to recognize and trigger on the short codes #238, **1234 and ##9837 all cause a query to be initiated and routed to one SCP to seek differentiation of the services invoked by the different short codes. Each of the short codes may be managed and provided by a different service provider. The service interaction manager is unable to easily differentiate the different service providers for short code services, since it is functionally directed to differentiating applications that share a DP trigger in the BCSM. That is, the service interaction manager cannot easily differentiate short codes that have the same trigger criteria at the same DP trigger. In addition, the SCP is unable to distinguish the services associated with different short codes because it operates with SS7 signaling, which is limited in the types of control that is possible within the available messaging operations. The SCP also does not have the functionality to fulfill service invocation requests initiated with short codes. Moreover, because it uses SS7 signaling, the SCP is unable to discriminate messages that are intended for different service requests or different service providers. The SCP can only pass on the messages to a previously provisioned forwarding address.

Accordingly, short code service invocation and service fulfillment is practically realized at present by provisioning the telecommunications switch or MSC with logic and identifiers in each instance that a short code response is desired. It would be desirable to implement a system in which short codes may be used to invoke a service, without having to reconfigure telecommunications switches or MSCs.

BRIEF SUMMARY OF THE INVENTION

In accordance with the present disclosure, there is provided a system and method for implementing a service invocation and fulfillment with a preprogrammed communication device. The device based implementation can operate alone or with a communication switch based implementation. The communication device recognizes an input sequence as a short code or multi-function code to select a communication channel and initiate a message to invoke services and potentially receive service fulfillment. The terms short code and multi-function code are used interchangeably to refer to a string of digits available in a communication device that include a code prefix and a service code. The code prefix and/or the service code identifies the digit string as a service invocation and/or invoked service. The preprogrammed communication device directly contacts a communication server, for example, to process the call, the service request or service fulfillment.

The preprogrammed device initiated service invocation is triggered by entry of a multi-function code prefix, such as "**" (star, star), that is input into the preprogrammed communication device. With the entry of the multi-function code prefix, the preprogrammed communication device is triggered to treat the subsequent input sequence as a multi-function code service request rather than a dialed directory number, for example. The multi-function code prefix is followed by an input digit string to identify the multi-function code service request. Accordingly, the preprogrammed communication device can recognize a multi-function code, process the service invocation or make determinations regarding multi-function code service requests. The telecommunication switches, communication channel or communication network need not be preconfigured to do any special processing, or have any special provisioning with this implementation of service invocation and fulfillment.

In one exemplary embodiment, the preprogrammed device recognizes service invocation codes and distinguishes the codes from USSD codes. For example, the preprogrammed device is configured to recognize a multi-function prefix, including a USSD prefix "**", process a code following the prefix, and look for a suffix or termination code, such as the USSD code "#". The multi-function codes distinguished from USSD codes cause invocation or triggering of services that are different from those offered under the USSD system. The multi-function codes distinguish from the USSD codes and creates a new namespace, that is, a new set of dialed digits recognized as codes. For example, the new namespace may be a set of 12 digit numbers in a 12 digit number namespace. According to this embodiment, the communication device programming is changed while the telecommunication switch programming is unchanged. With this approach, neither the telecommunication switches nor communication network components need be modified or provisioned for any additional services.

In accordance with another exemplary embodiment, a communication device in a communication network is programmed to determine an optimal connectivity method between the communication device and the service fulfillment system or server. The optimal connectivity can be based on the type of service invoked, a determination of the location of the communication device and other dynamic or static factors, such as, for example, time of day, network availability and other factors that may influence optimization of connectivity. This type of approach is different from the USSD system, which does not perform dynamic connectivity determination, since the processing of the USSD code sequence is predetermined. That is, communication with the USSD server occurs through a GSM (Global System for Mobile Communications) signaling channel. Accordingly, connectivity optimization in accordance with the present disclosure provides greater flexibility in communication with a service system or server. For example, the communication with the service system or server can be through a GSM signaling channel, mobile-originated (MO) SMS (Short Message Service), voice communication, GPRS (Generalized Packet Radio Service) or CDMA (Code Division Multiple Access) EVDO (Evolution Data Only/Evolution Data Optimized)/W-CDMA (Wideband CDMA) data connection, Wi-Fi, Wi-Max (Worldwide Interoperability for Microwave Access) and any other types of communication methods available to the communication device.

In an exemplary embodiment, the communication device detects an entered special prefix such as "" in an input sequence and processes the call as a multi-function code service request rather than as a regularly dialed directory number. During or after entry of the input sequence into the communication device, a determination is made in the preprogrammed communication device as to whether the input sequence includes a special multi-function code, prefixed by a special dialing prefix such as "". If no multi-function code dialing prefix is found, the preprogrammed communication device determines that the input sequence is a regularly dialed directory number and processes it in accordance with well established and known techniques. If the communication device detects a special multi-function code dialing prefix, the entry is recognized as a service invocation by the user, and the communication device performs special processing to analyze or process the multi-function code. For example, the preprogrammed communication device can determine network connectivity options available to the user and the device. According to one exemplary embodiment, the communication device accesses a user subscription profile stored within the device, such as in a SIM (Subscriber Identification Module) card in GSM devices, to determine whether the user is subscribed to a mobile wireless data service such as GPRS/UMTS (Universal Mobile Telecommunications Systems), CDMA or other services. In addition, the communication device can determine whether a mobile wireless data connection can be established based on the location of the communication device during service invocation.

According to another exemplary embodiment, the preprogrammed communication device establishes network connectivity with a communication network. The network connectivity may include one or more of a voice channel, an MO-SMS, GSM/GPRS/UMTS data connection, CDMA EVDO data connection, Wi-Fi, Wi-Max or any other type of network connectivity that may be available with the communication network and the communication device. The network connectivity established by the communication device may be based on a determination of user service registration, subscription or establishment of available network connectivity options.

In accordance with another embodiment, the preprogrammed communication device establishes a connection with a service fulfillment center. Upon establishing such a connection, the communication device sends the entered multi-function code input sequence to the service fulfillment center. Alternately, or in addition, the communication device may process the recognized multi-function code input sequence to produce a code or identifier that can be transmitted to, and recognized by the service fulfillment center. The multi-function code input sequence, or code or identifier transmitted to the service fulfillment center can be produced by actuating a function in the communication device, such as by actuating a specially programmed function key, for example. The communication device has the functionality to recognize a service invocation request distinguished from a USSD service request or a directory dialed telephone number, and convey the recognized service invocation to the service fulfillment center.

The communication device may also send information about the communication device to the service center. The input sequence or information about the communication device may include such items as a device MDN (Mobile Directory Number) or MSISDN (Mobile Station ISDN (Integrated Services Digital Network) Number), a device user ID (i.e., the ID of the user/owner of the telecommunications device), device ID (brand and model number, ESN (Electronic Serial Number), IMEI (International Mobile Equipment Identity)), device capabilities (screen size, and other device parameters), present location (e.g., cell ID, GPS (Global Positioning System) (X-Y coordinates) location information) for the device, or any other type of information that may be helpful for invocation or fulfillment of services.

In accordance with another exemplary embodiment, the preprogrammed communication device can be reprogrammed to recognize different functions. For example, a preprogrammed communication device may be set up upon manufacture to recognize a multi-function prefix code of "**" to indicate a subsequent multi-function code. The preprogrammed communication device may be dynamically reprogrammed by a service center communicating with the communication device, for example, to recognize other multi-function code prefixes such as "*", "#", "##", "*#" or "#*", for example. The communication device can be programmed to recognize different multi-function code prefixes or codes dynamically by communication with a service center to permit the communication device to respond to newly available services or modify a size of a multi-function code namespace.

BRIEF DESCRIPTION OF THE SEVERAL VIEWS OF THE DRAWINGS

The invention is described in greater detail below, with reference to the accompanying drawings, in which.

DETAILED DESCRIPTION OF THE INVENTION

Figure 1:
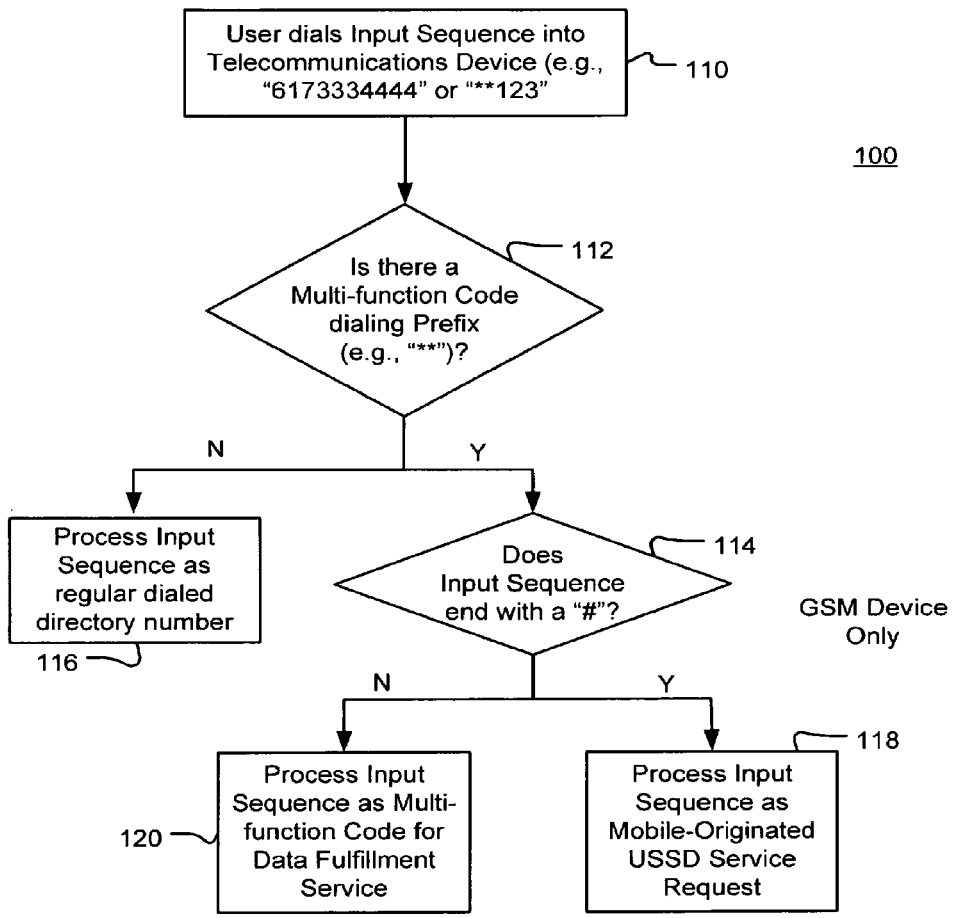
FIG. 1 is a flow diagram illustrating communication device processing.

The present disclosure provides a system and method for invocation and fulfillment of services requested through a preprogrammed communication device. The communication device may be a telecommunication device including a mobile phone, such as a cellular phone, a wireless PDA (Personal Digital Assistant), a pager, a land line telephone, or other communication devices that can be programmed to recognize specific input sequences to invoke a service. The communication device is preprogrammed to recognize specific input sequences that signal a service invocation or request. The recognized input sequence prompts a determination of a communication channel for supplying information to a service system or server to cause service invocation. The determination of a communication channel can be based on a number of factors, including availability, subscription, registration, optimal data exchange and other factors that can be preprogrammed or logically analyzed in the communication device. Upon selection of a communication channel, the communication device produces signaling with the appropriate communication network in relation to the selected communication channel to implement the service invocation. For example, the communication device can select a communication channel and produce signaling to invoke communications according to GSM (Global System for Mobile Communications), GPRS (Generalized Packet Radio Service), CDMA (Code Division Multiple Access) EVDO (Evolution Data Only/Evolution Data Optimized), W-CDMA (Wideband CDMA), Wi-Fi, Wi-Max (Worldwide Interoperability for Microwave Access) or other communication methods, standards or protocols. Optionally, the communication network may also be configured to recognize signaling or multi-function codes produced by the communication device.

In general, the preprogrammed communication device operates to recognize a user input as a service invocation, and causes the service center to be notified of the service invocation. The preprogrammed communication device determines available connectivity to communicate with the service center, and selects an optimal communication channel for sending information related to the requested service, such as the user input. For example, a given multi-function code input by a user can be used to invoke a service. If the preprogrammed communication device recognizes a multi-function code, the input sequence is provided to the service system or server for further service processing. The communication device may permit or recognize input sequences that are automated, such as may be provided with a specially programmed function key, for example. The communication device may also recognize a user input as a service request distinguished from a USSD service request or directory dialed number, and provide a code or service invocation identifier to the service center. That is, the user input to the communication device is recognized as a service invocation and the communication device so informs the service center, where the user input and notification to the service center need not be the same code or identifier.

The communication device, upon recognition of a multi-function code input sequence, for example, may also provide additional information to the service system or server along with the multi-function code input sequence. For example, the communication device may provide device information, such as a device MDN (Mobile Directory Number), a device user ID, such as user ID, device owner, as well as brand, model type, ESN (Electronic Serial Number) or IMEI (International Mobile Equipment Identity). Other parameters may also be sent from the communication device to the service system, such as screen size of the device, present location, or any other type of information about the device or user that may assist in fulfilling the services requested through the multi-function code input sequence. The communication network through which the communication device passes data to the service system need not have any special configuration or programming to process or transmit the multi-function service request, and can act as a simple data transfer medium.

Referring now to FIG. 1, a flow diagram 100 illustrates a process for service invocation and discrimination of regular dialed directory numbers, multi-function codes and USSD service requests. In block 110, a user inputs a sequence of codes or symbols, such as representations of alphanumeric or other characters. The input may be in the form of a sequence of button presses on the communication device, or any other types of data entry or user interface input, including function key input, input that implements a sequence or sequences of symbols, voice recognition input or any other types of means for inputting information into the communication device. In decision block 112, the communication device determines whether the input includes a multi-function code dialing prefix. The prefix may be any type of alphanumeric or character input, specially set aside to indicate a subsequent multi-function code sequence. If the communication device determines that a multi-function code dialing prefix was entered, process control flows to decision block 114. Otherwise, process control flows to block 116, as the input is determined to be a regularly dialed directory number, such as a telephone subscriber number. The communication device processes the input sequence as a regular dialed directory number in block 116.

In decision block 114, the input sequence starting with the multi-function code dialing prefix is checked to determine if the sequence ends with a "#" character. An input sequence that begins with a multi-function code dialing prefix and ends with a "#" character is identified as a USSD service request that is used in GSM signaling. That is, USSD services are available in GSM signaling alone, and are not available in CDMA signaling, for example. More generally, the input sequence is checked to determine associations with standard-based special service feature requests, an example of which is USSD in GSM signaling. If the sequence does end with a "#" character, the sequence is determined to be a mobile originated USSD service request, and process control is transferred to block 118, where the request is processed according to USSD service conventions. If the input sequence does not end in a "#" character as determined in block 114, process control passes to block 120, where the input sequence is processed as a multi-function code for invocation of a service.

As part of the processing conducted in block 120, the communication device determines communication network connectivity options available to the user and the device. Connectivity options available to the communication device include communication channels that can transmit information to a service system or server for invocation of the requested service. For example, the communication device may be presented with connectivity options that include a voice channel, MO-SMS, GSM/GPRS/UMTS data connection, CDMA EVDO data connection, Wi-Fi, Wi-Max or other types of network connectivity that permit the communication device to transmit information to the service system or server. Based on the available network connectivity options, the communication device selects one or more of the communication channels to transmit information related to the service invocation, such as the digit string entered into the communication device. The criteria for selecting among the communication channels may be based upon the determination of an optimal connectivity path given the connectivity options, for example. The information provided by the communication device to the service system or server may include parameters related to device display, memory capacity, location and other user and device dependent connectivity options. The communication device may also include a user subscription profile stored, for example, in a SIM (Subscriber Identification Module) card in GSM devices. The subscription profile can provide information related to user subscriptions, including mobile wireless data services, such as GPRS/UMTS (Universal Mobile Telecommunications Systems) and CDMA, for example. In addition, the communication device may determine whether a mobile wireless data connection can be established where the communication device is located when a service is invoked.

The service invocation and fulfillment can take a number of different forms, offering the advantages of flexibility in breadth of scope of services as well as fulfillment. In one implementation, a service provider registers with a proxy service to which users subscribe for service invocation and fulfillment. The proxy service acts as an intermediary between the service provider and the user, so that the user need not interact directly with the service provider and vice versa. This configuration permits the user to maintain a privacy separation from the service provider through the proxy service. For example, the user may register with the proxy service to receive certain types of services on a "push" basis, meaning that the services are provided or fulfilled to the user upon becoming available from the service provider. Registration of the user with the proxy service defines how the user wishes to receive this type of service fulfillment. Alternately, or in addition, the user can invoke a service with the proxy service, and receive the service fulfillment from the service provider based on the service invocation. Examples of the types of services available include information about advertised products or services, participation in voting or polling activities, obtaining reprints of articles or other publications, browsing and purchasing magazine subscriptions, receiving music sound clips or files and sharing personal information with other users. It should be apparent that a wide variety of services can be obtained through the described system, so that the above examples should be considered to be non-limiting.

The communication device is operable to establish network connectivity with a communications network, and can provide the connectivity on a variety of bases. For example, the network connectivity may be voice channel, mobile-originated (MO) SMS, GSM/GPRS/UMTS data connection, CDMA EVDO data connection, Wi-Fi, or other available types of network connectivity in relation to the device and communication network. Any of these types of network connectivity may be used to invoke services or obtain service fulfillment. The communication device can also establish a connection with a service fulfillment center, such as the above discussed proxy service.

With a communication network connection, the communication device provides signaling through the communications network in relation to the service invocation. The signaling may include the multi-function code input sequence, information about the communication device, or signals already processed in relation to the multi-function code or service invocation. If the signaling includes already processed information, the communication network and data fulfillment center can operate to fulfill service requests with greater speed, since processing of a multi-function code input sequence, for example, need not be conducted in the communication network or data fulfillment center.

According to one exemplary embodiment, the communication device is configured to implement a reduced number of processing steps. The reduced number of processing steps permits the communication device to continue to realize the functionality of recognizing a multi-function code and providing the same to the data service center. For example, the communication device may be a mobile wireless device that typically has relatively less processing and storage capability than other devices that are not wireless. In addition, the communication device as a wireless device has limited available power in the general case, which can be conserved by configuring the communication device to implement the desired service invocation functions with a reduced number of processing steps, or as few processing steps as possible. Accordingly, in one exemplary embodiment, the communication device simply determines the input sequence to be a multi-function code, and sends the sequence over a predetermined communication channel to a service system or server for further processing. According to a feature of the disclosed system, the communication device also sends device or user related information as a minimal set of data to identify a user, an owner, or type of communication device with reduced processing requirements to conserve processing capability or power in the communication device.

The information sent by the communication device may include a device MDN or MSISDN (Mobile Station ISDN (Integrated Services Digital Network) Number) a device user's ID (i.e., ID of the user/owner of the communication device), device ID (brand and model number, ESN, IMEI), device capabilities (screen size and other device parameters) or present location (e.g., cell ID, GPS (Global Positioning System) (x-y coordinates) location information) of the device.

The service system or server may include a data fulfillment center that provides service fulfillment. When the data fulfillment center receives the multi-function code input sequence or service identifier from the communication device, a response action is triggered as indicated by the requested service. The responses may include any type of service fulfillment activity, including fulfillment of invoked services such as those described above.

By implementing a service invocation determination in the communication device, a number of advantages are realized. For example, there is no requirement to modify the communication network equipment, such as communication switches, to provision functionality to accommodate processing of multi-function codes or special input sequences formed by the communication device under the control of the user. In addition, the disclosed system and method is compatible with and conforms to telecommunications networks in existence, including GSM networks, for example. There is no requirement to modify GSM network protocols. Furthermore, device specific and user service specific information, such as device ID, location information, user subscription profile information and other such information is readily available in the communication device. The communication device can provide the device specific and user specific information to the data fulfillment center, rather than having to reference the information at the center, or continue to update centrally located specific information. The configuration can contribute to optimizing response actions to service requests, including timeliness of response. Furthermore, the disclosed system and method can use any communication channel available to the communication device, and is not restricted to communication with a mobile switch center (MSC), and subsequent SS7 signaling, for example.

The SS7 signaling protocol is described in ITU-T Q series Recommendations, Bellcore standard "GR-606-CORE LSSGR Common Channel Signaling, Section 6.5," Issue 1, Rev. 2, Bellcore, December 1995 and ANSI standards "ANSI T1.110-1992 Signaling System No. 7 (SS7) General Information," American National Standards Institute (ANSI), 1992; "ANSI T1, 111-1992 Signaling System No. 7 (SS7) Message Transfer Part," ANSI, 1992; "ANSI T1, 112-1992 Signaling System No. 7 (SS7) Signaling Connection Control Part," ANSI, 1992, which are all hereby incorporated herein by reference.

Figure 2:
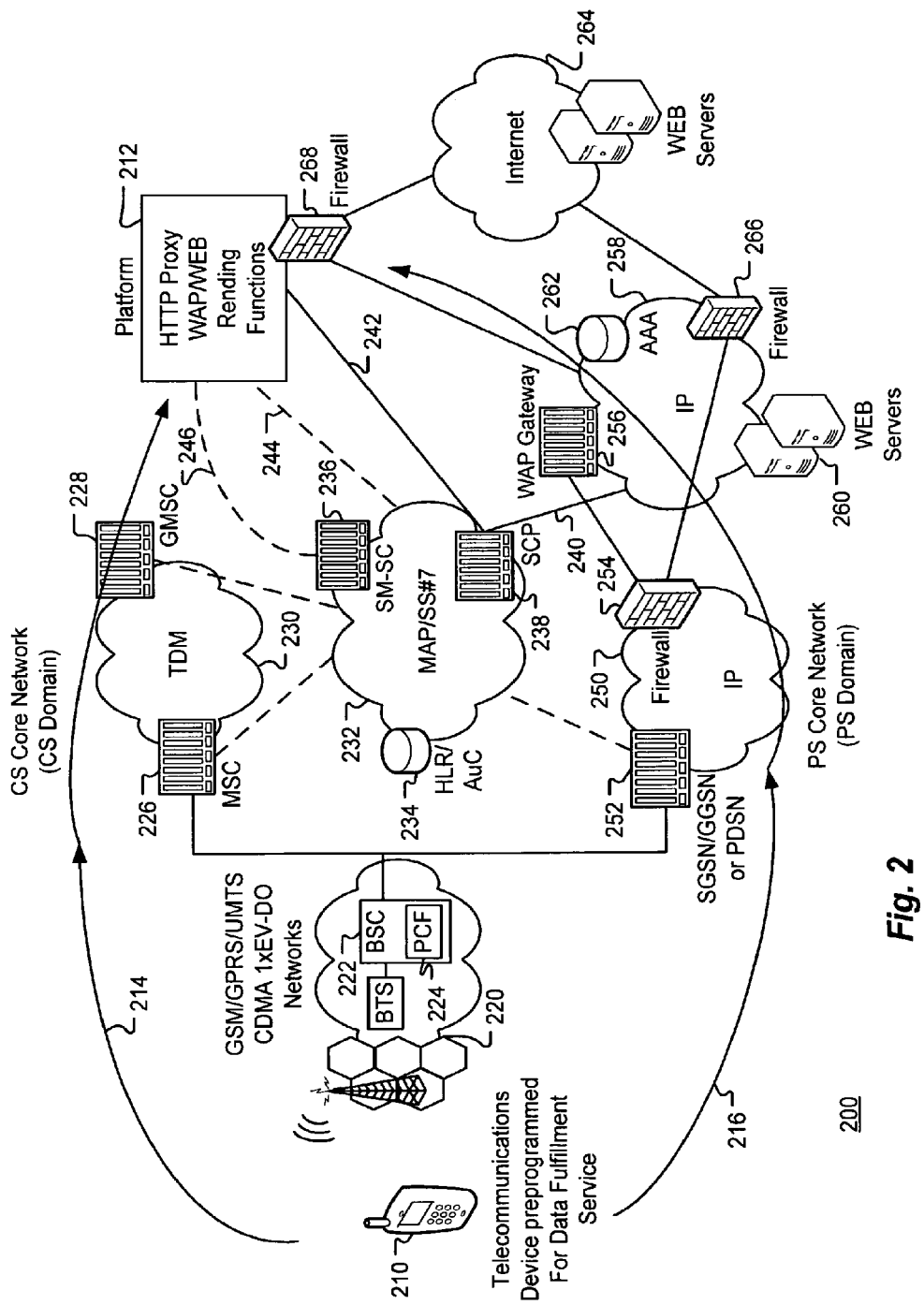
FIG. 2 is a diagram of a communication network in accordance with an embodiment of the present invention.

Referring now to FIG. 2, a generalized mobile telecommunications network diagram is illustrated as network 200. A wireless telecommunication device 210 is illustrated as sending a multifunction input sequence together with device specific information to a data fulfillment center 212. Communication device 210 is preprogrammed to recognize multi-function code input sequences and cause service invocation based on recognized input multi-function codes. The transfer of information from communication device 210 to center 212 can take place over available network connectivity, including voice channel 214 and wireless data connection 216.

Invocation of services through voice channel 214 may include initiation of a call to a preprogrammed directory telephone number. For example, communication device 210 is programmed to dial a special directory number to an IVR (Interactive Voice Response), which provides menus that can be navigated by input to communication device 210 from a user. Service invocation through voice channel 214 may include providing information in an SMS format, including MO SMS. Accordingly, communication device 210 can select a communication channel, such as voice channel 214, and can also select different messaging formats available in the selected communication channel. This arrangement provides a wide degree of flexibility for implementing service invocation through communication device 210.

For example, a multi-function code may be provided that has associated preprogrammed logic to cause communication device 210 to select voice channel 214 as a communication channel, and also select transmission in an SMS format. Another multi-function code may include logic to select voice channel 214 for a communication channel, and provide a directory telephone number to contact a call service center or an IVR.

The functionality for submitting the service invocation request in a desired communication channel and format is provided in communication device 210, and does not require any reconfiguring or special arrangement for communication network components. The selection of a communication channel and/or messaging format or protocol can be based on a number of factors. For example, the communication channel and/or messaging format or protocol may be chosen based on the preprogrammed multi-function code. Entry or selection of the code in the communication device automatically causes selection of a given channel and/or protocol. Alternately, or in addition, the channel and/or protocol may be chosen based on available parameter values, such as a user, device or location ID, subscription or registration information, device characteristics, or other available parameter values that can contribute to selecting a channel and/or format. Furthermore, the channel and/or protocol may be chosen based on availability or optimability. For example, a data channel may be preferred over a voice channel for certain service invocations, when the data channel is available.

Voice channel 214 is established through network connectivity from communication device 210 to base transceiver station (BTS) 220. BTS 220 handles communication to and from communication device 210 through the use of various antennas, transceivers and other equipment for wireless communication. The procedures used to provide common cellular services with interaction between different cellular systems, including message types and the parameters therein, are described in Telecommunications Industry Association (TIA) standard "TIA/EIA IS-41.1-C Cellular Radiotelecommunications Intersystem Operations: Functional Overview," TIA, February 1996 and the other standards in the series: IS-41.2-C Intersystem Handoff Information Flows; IS-41.3-C Automatic Roaming Information Flows; IS-41.4-C Operations, Administration, and Maintenance Information Flows and Procedures; IS-41.5-C Signaling Protocols; and IS-41.6-C Signaling Procedures, each published by TIA, February 1996, hereinafter referred to collectively as TIA/EIA IS-41-C, which are hereby incorporated herein by reference.

BTS 220 communicates with and is controlled by base station controller (BSC) 222, which manages a number of aspects of BTS operation, including frequencies, mobile device power level measurements and handovers between BTSs. Base station controller 222 includes a packet core function, also referred to as a packet control function (PCF) 224, which serves as a specialized router that manages packet (data) traffic between various BSCs and other concentrator or gateway devices.

For voice channel 214, communication is conducted through BSC 222 to mobile switching center (MSC) 226, which can provide connectivity to a general telephone switching network, for example through gateway mobile switching center (GMSC) 228 through circuit switched network 230 using time division multiplexing (TDM). Alternately, MSC 226 can provide connectivity through SS7 signaling network 232, using mobile application part (MAP) messages, for example. SS7 signaling network 232 may include various components such as home location register (HLR)/authentication center (AuC) 234, short message service center (SMSC) 236 and service control point (SCP) 238, for example.

When MSC 226 is provisioned with a trigger and a point code destination address identifying SCP 238, SCP 238 can provide messaging to data fulfillment center 212 over connection 242, which messaging can be of a proprietary nature, in which voice channel transmitted data is relayed to data fulfillment center 212. For example, SCP 238 may forward the multi-function code and/or other information related to the user, device, subscriptions, registrations or other information helpful in establishing a service invocation or providing service fulfillment. SCP 238 may also be connected to data fulfillment center 212 over an internet protocol (IP) connection 240 to forward information related to the service invocation at communication device 210. However, if MSC 226, and other network components are not reconfigured to provide special messaging to data fulfillment center 212, voice channel 214 may communicate directly with data fulfillment center 212, such as through signaling path 244, for example. Path 244 represents one of several possible routes a voice channel, directory dialed telephone number, may be directed from communication device 210 to data fulfillment center 212 to transfer information related to a service invocation over voice channel 214. In such an embodiment, the communication network components need not be reconfigured to permit service invocation from communication device 210.

SMSC 236 may also provide a communication path 246 to data fulfillment center 212 using a circuit switched connection and SMS messaging, including MO-SMS messaging. Path 246 can carry information in SMS messaging format that specifies the service to be invoked, as well as providing other information related to the user, subscription, registration or other information helpful in establishing a service invocation or providing service fulfillment. Communication device 210 is preprogrammed to utilize SMS messaging over path 246 according to a predetermined criteria, such as the entry or activation of a given multi-function code in communication device 210. Again, the network components in voice channel 214 need not be reconfigured to permit service invocation from preprogrammed communication device 210.

It should be apparent that other types of communication devices may be used with network 200 to invoke a service, or receive service fulfillment. For example, a preprogrammed land line telephone can be provided to submit service invocation requests over SS7 signaling network 232. Indeed, any other type of circuit switched or packet switched communication devices can be used to transmit information to data fulfillment center 212 to invoke a desired service, and potentially receive service fulfillment.

Wireless data connection 216 similarly provides a communication channel to permit communication device 210 to communicate with center 212. Wireless data connection 216 provides a path for wireless data to be transmitted and converted to IP or packet switched data that can be transmitted over an IP network. In accordance with this embodiment, communication device 210 selects wireless data connection 216 as a desired communication channel for transmitting information to center 212. Communication device 210 is programmed with logic to select wireless data connection 216 under certain circumstances, such as availability of a wireless data connection, the existence of a subscription to a wireless data communication provider, and other criteria that may include user preferences, traffic density, location information and other information that can contribute to assisting communication device 210 to select wireless data connection 216. Certain multi-function codes require the use of wireless data connection 216, and may indicate to the user that the service if unavailable if the given criteria for establishing a wireless data connection is not met. Alternately, or in addition, certain multi-function codes may be accompanied with logic to select any available communication channel, or an optimal communication channel, as well as specific or any available messaging technique or protocol.

Wireless data connection 216 is established through BTS 220, which handles communication to and from communication device 210 through the use of various antennas, transceivers and other equipment for wireless communication, as discussed above. BTS 220 communicates with and is controlled by BSC 222, which in turn communicates through PCF 224 to provide wireless data over wireless data connection 216. PCF 224 is connected to a GSM operable node 252 that provides general packet radio service (GPRS) support including service (SGSN) and gateway (GGSN) support. Node 252 can provide operations for a packet data support node (PDSN) to support CDMA networks as well. Node 252 in general provides support for connecting to packet switched (PS) data networks, including IP network 250. These types of connections support GSM communications for packet data transmission. Data from node 252 can be transmitted to center 212 over IP network 250, through firewall 254 and wireless application protocol (WAP) gateway 256.

WAP gateway 256 is part of IP network 258, which includes Web servers 260 and an authentication, authorization and accounting (AAA) database 262. IP network 258 can be a private network used for data transmission, such as by subscription or registration. IP network 258 can connect with Internet 264 through firewall 266, to provide general access to data communication and information on a global basis. Center 212 also includes a firewall 268 for communication with IP based networks. Firewalls 254, 266 and 268 provide a measure of protection to prevent center 212 and IP networks 250, 258 from being invaded with unauthorized messages by unauthorized personnel. Accordingly, wireless data connection 216 can be implemented through a variable pathway using IP connectivity and various messaging protocols to permit service invocation and center 212, as well as permitting messaging and service fulfillment to be delivered from center 212 to communication device 210.

Center 212 can provide service fulfillment according to any number of available avenues. For example, a service invocation from communication device 210 may prompt a fax to be sent, a postal mailing, an email, an SMS message or other forms of information or service delivery. Information delivered to communication device 210 may include rendering information suitable for properly displaying delivered information on communication device 210 in accordance with the display capabilities of communication device 210.

Figure 3:
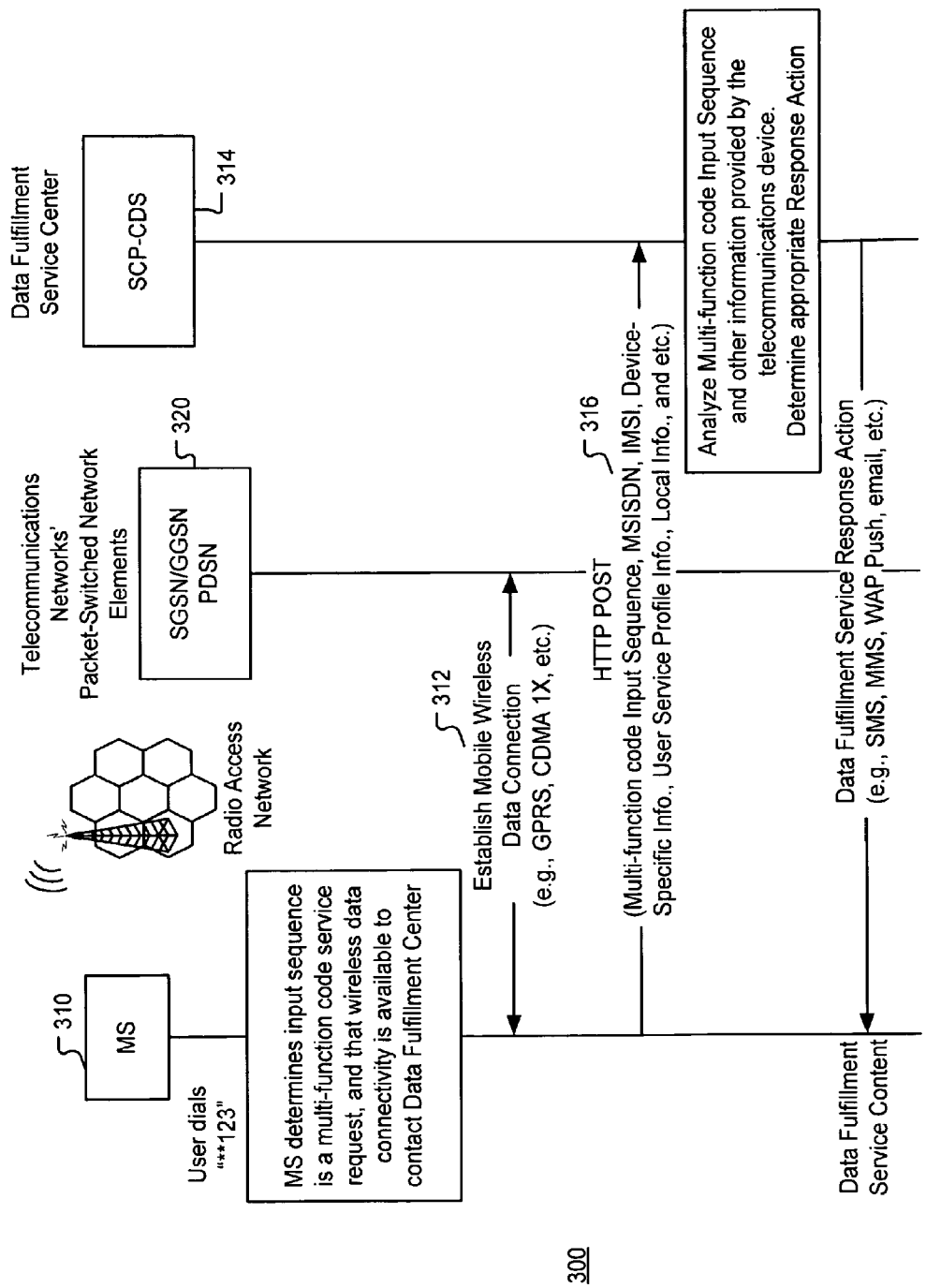
FIG. 3 is a call flow diagram in accordance with an embodiment of the present invention.

Referring to FIG. 3, an exemplary embodiment of a call flow is illustrated as call flow 300. In call flow 300, a communication device 310 establishes a mobile wireless data connection 312 upon determining that an input entered by the user is a service invocation request, such as by recognizing a multi-function code, for example. Wireless data connection 312 can be determined based on an optimal connectivity technique configured in preprogrammed communication device 310 in accordance with the disclosed system and method. For example, communication device 310 can be configured to determine if a wireless data connection can be established. A wireless data connection, if one can be established, may be preferred over establishing a voice channel type connection, such as for voice communication or SMS messaging.

One reason the wireless data connection may be preferred is better quality or throughput over an equivalent voice channel. According to exemplary embodiment, the user or owner of the communication device subscribes to a wireless data service, which is recognized by the communication device. The communication device may determine that the user or owner of the communication device subscribes to a wireless data service by inspecting a user profile or user profile information contained in the communication device. For example, a SIM card can provide user, owner or user profile information. If the communication device determines that the user or owner does not subscribe to a wireless data service, other communication methods can be employed to establish a communication channel as an optimized connection.

Alternately, or in addition, the disclosed system can provide a communication device that attempts to establish a wireless data connection without first checking user, owner or user profile information for subscription information. If the communication device fails to establish a wireless data connection, then other communication methods can be employed to establish a communication channel for service invocation. Call flow 300 shows wireless data connection 312 as an exemplary optimized connectivity technique in accordance with the assumption that communication device 310 attempts and succeeds in establishing a wireless data connection, whether subscription information is inspected or not.

In the embodiment shown in call flow 300, an optimal connection is established as wireless data connection 312 which may be GPRS, CDMA EVDO, Wi-Fi or other wireless data connection formats. Once wireless data connection 312 is established as an optimal technique to contact data fulfillment service center 314, communication device 310 uses various protocols to communicate with data fulfillment service center 314. Communication device 310 is not limited to wireless data connection 312, but may use other methods of connectivity, including cellular voice connection, MO-SMS, Wi-Fi IP connection, and any other type of available connectivity.

Upon establishing connectivity, communication device 310 interfaces with data fulfillment service center 314 using a given protocol, such as HTTP protocol 316. Various other communication protocols are also available to permit communication device 310 to interface with data fulfillment center 314, including SIP (Session Initiation Protocol), or proprietary protocols. The multi-function code input sequence is transmitted to data fulfillment service center 314, optionally with other device and user service profile information from communication device 310. Data fulfillment service center 314 responds by implementing a response action indicated by the multi-function code service request. Response actions to the multi-function code service request can be numerous, including responses to the service invocations discussed above. The form of the responses are also numerous, such as SMS, MMS (Multimedia Messaging Service), WAP (Wireless Application Protocol) push, email, voice communication and any other type of available response form.

It should be emphasized that the above-described embodiments of the present invention are just possible examples of implementations, merely set forth for a clear understanding of the principles of the invention. Many variations and modifications may be made to the above-described embodiments of the invention without departing from the spirit and principles of the invention. All such modifications and variations are intended to be included herein within the scope of this disclosure and the present invention and protected by the following claims.

What is claimed is:

1. A communications device comprising:
at least one function-identifier table for storing one or more of a non-numeric code prefix or a service code programmed for identifying a service invocation;
an interface in the communication device configured to receive an input sequence that includes an input function code that identifies a service invocation;
a processing engine in the communication device, the processing engine being communicatively coupled to the interface and being operative to determine if the input function code identifies a service invocation corresponding to a function identifier stored in the function-identifier table;
wherein:
the processing engine is operable, in response to determining that the input function code identifies the service invocation, to transmit information related to the service invocation; and
the communication device is operable to establish a connection with a service-fulfillment center and to receive therefrom, during a communication between the communication device and the service-fulfillment center, dynamic reprogramming operative to alter contents of the function-identifier table.

2. The system according to claim 1, wherein the altered contents of the function-identifier table permit the communication device to respond to newly available services.

3. The system according to claim 1, wherein the altered contents of the function-identifier table modify a size of a multi-function code namespace.

4. The system according to claim 1, wherein the altered contents of the function-identifier table include additional non-numeric code prefixes.

5. The system according to claim 1, wherein one or more of the function identifier tables further comprises additional parameters associated with the type of service invocation.

6. The system according to claim 1, wherein the input sequence further comprises an input service code for identifying a service to be invoked with the service invocation.

7. The system according to claim 1, wherein the information transmission further comprises one or more of a function identifier, the input sequence, a mobile directory number (MDN), communication device brand, model type, electronic serial number (ESN), international mobile equipment identity (IMEI), screen size, location, owner or user subscription profile or user subscriptions.

8. A method for permitting a user to invoke a service with a communication device in a communication network, comprising:

programming the communication device with at least one function-identifier table containing one or more of a non-numeric code prefix or a service code for triggering service invocation;

receiving an input sequence at the communication device to identify a service invocation;

determining that a function identifier in the input sequence that includes a non-numeric code prefix identifies a service invocation corresponding to a function identifier stored in the function-identifier table;

in response to determining that the function identifier identifies the service invocation, transmitting information related to the service invocation to a service-fulfillment center, wherein, during a communication between the communication device and the service-fulfillment center, the communication device receives dynamic reprogramming operative to alter contents of the function-identifier table.

9. The method according to claim 8, wherein the altered contents of the function-identifier table permit the communication device to respond to newly available services.

10. The method according to claim 8, wherein the altered contents of the function-identifier table modify a size of a multi-function code namespace.

11. The method according to claim 8, wherein the altered contents of the function-identifier table include additional non-numeric code prefixes.

12. The method according to claim 8, wherein one or more of the function identifier tables further comprises additional parameters associated with the type of service invocation.

13. The method according to claim 8, wherein the input sequence further comprises an input service code for identifying a service to be invoked with the service invocation.

14. The method according to claim 8, wherein the information transmission further comprises one or more of a function identifier, the input sequence, a mobile directory number (MDN), communication device brand, model type, electronic serial number (ESN), international mobile equipment identity (IMEI), screen size, location, owner or user subscription profile or user subscriptions.

\* \* \* \* \*